United States Patent
Hsieh

(10) Patent No.: US 9,308,644 B2
(45) Date of Patent: Apr. 12, 2016

(54) ROBOTIC ARM FOR PROCESSING MACHINE

(71) Applicant: Hiwin Technologies Corp., Taichung (TW)

(72) Inventor: Wu-Teng Hsieh, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 357 days.

(21) Appl. No.: 14/098,050

(22) Filed: Dec. 5, 2013

(65) Prior Publication Data

US 2015/0158185 A1 Jun. 11, 2015

(51) Int. Cl.
| | |
|---|---|
| *B25J 9/00* | (2006.01) |
| *B25J 9/04* | (2006.01) |
| *B23Q 1/01* | (2006.01) |
| *B23Q 1/48* | (2006.01) |
| *B23Q 1/54* | (2006.01) |
| *B23Q 7/04* | (2006.01) |

(52) U.S. Cl.
CPC .............. *B25J 9/044* (2013.01); *B23Q 1/015* (2013.01); *B23Q 1/4833* (2013.01); *B23Q 1/5493* (2013.01); *B23Q 7/043* (2013.01); *B25J 9/0096* (2013.01); *Y10S 901/21* (2013.01); *Y10S 901/23* (2013.01); *Y10S 901/38* (2013.01); *Y10T 74/20317* (2015.01)

(58) Field of Classification Search
CPC ........ B25J 9/044; B25J 9/0096; B23Q 1/015; B23Q 1/4833; B23Q 1/5493; B23Q 7/043; Y10T 74/20317; Y10S 901/21; Y10S 901/23; Y10S 901/38

See application file for complete search history.

(56) References Cited

U.S. PATENT DOCUMENTS

| | | | | |
|---|---|---|---|---|
| 5,634,377 A | * | 6/1997 | Kimura et al. | 74/490.04 |
| 8,770,905 B2 | * | 7/2014 | Al-Mouhamed et al. | 414/5 |
| 9,126,330 B2 | * | 9/2015 | Yoshino | |
| 9,161,512 B2 | * | 10/2015 | Hofman et al. | |
| 2007/0020081 A1 | * | 1/2007 | Gilchrist et al. | 414/744.5 |
| 2014/0174240 A1 | * | 6/2014 | Peng et al. | 74/490.03 |
| 2015/0033898 A1 | * | 2/2015 | Hsieh | 74/490.06 |

FOREIGN PATENT DOCUMENTS

| | | |
|---|---|---|
| JP | 1992-109815 U | 9/1992 |
| JP | 1999-77566 A | 3/1999 |

\* cited by examiner

*Primary Examiner* — Scott Lowe
(74) *Attorney, Agent, or Firm* — Muncy, Geissler, Olds & Lowe, P.C.

(57) ABSTRACT

A robotic arm includes a motor, a ball screw spline shaft and a ball nut connected to the motor and attached to the ball screw spline shaft in such a manner that when the motor is started, the ball nut is rotated by the motor, and the ball screw spline shaft is forced to carry a movable seat linearly, causing the movable seat to synchronously move a tension bar to the position where a stopper member at the tension bar is stopped at a mount, and thus the movable seat can be pulled by the tension bar to bias a grip.

4 Claims, 5 Drawing Sheets

ROBOTIC ARM FOR PROCESSING MACHINE

BACKGROUND OF THE INVENTION

1. Field of the Invention

The present invention relates to processing machine technology, and more particularly, to a robotic arm for processing machine.

2. Description of the Related Art

In robotic technology, especially robotic arms have long been used in many automated factories. For example, Japanese Patent 11-77566 discloses a robotic arm capable of making lifting, swinging and turning-around actions to facilitate gripping a glass substrate so as to deliver glass substrates. However, in order to make complicated actions, this prior art design of robotic arm needs to use at least three servomotors, resulting in a high robotic arm manufacturing cost and the indisputable fact that it is really not conducive, to using a large amount of robotic arms in a factory. Further, Japanese Patent 4-109815 discloses a robotic arm clamping mechanism that is capable of changing the posture of the robotic arm subject to different conditions so that the robotic arm can grip workpieces in different directions, enabling workpieces to be processed under the same processing condition. However, this conventional robotic arm design simply uses one single rotating shaft to perform a flipping action. The operational efficiency of this prior art design is insufficient. An improvement in this regard is needed.

SUMMARY OF THE INVENTION

The present invention has been accomplished under the circumstances in view. It is the main object of the present invention to provide a robotic arm for processing machine, which achieves cost reduction and improves the operational. efficiency.

To achieve this and other objects of the present invention, a robotic arm of the invention comprises a mount, a driving mechanism, a linear transmission mechanism, a gripping device, and a positioning mechanism. The driving mechanism comprises a motor, a first belt pulley, a second belt pulley and a transmission belt. The motor is mounted at the mount, comprising a drive shaft. The first belt pulley is rotatably mounted in the mount, and connected to the drive shaft of the motor. The second belt pulley is rotatably mounted in the mount. The transmission belt links the first belt pulley and the second belt pulley. The linear transmission mechanism comprises a ball screw spline shaft, a ball nut and a spline socket. The ball screw spline shaft is rotatably inserted through the mount. The ball nut is connected to the second belt pulley of the driving mechanism, and attached to the ball screw spline shaft. The spline socket is affixed to the mount, and attached to the ball screw spline shaft. The positioning mechanism comprises a tension bar and a stopper member. The tension bar is axially movably inserted through the mount. The stopper member is radially inserted through the tension bar, and detachably stopped against the mount. The gripping device comprises a movable seat, and a grip connected to the movable seat, said movable seat comprising a first pivot joint part and a second pivot joint part. The first pivot joint part is pivotally connected to a bottom end of the ball screw spline shaft of the linear transmission mechanism. The second pivot joint part is pivotally connected to a bottom. end of the tension bar of the positioning mechanism. Thus, the movable seat can be synchronously moved with the ball screw spline shaft tip and down, and pulled by the tension bar to bias the grip when the stopper member is stopped at the mount.

Preferably, the mount comprises a retaining groove located on atop wall thereof for receiving the stopper member to limit the stroke of the tension bar.

Preferably, the tension bar comprises an axial slot, a screw hole disposed in communication with the axial slot, and a spring accommodation hole disposed in communication with the axial slot. The stopper member is inserted through the axial slot of the tension bar. The positioning mechanism further comprises an adjustment bolt and a first compression spring. The adjustment bolt is threaded into the screw hole of the tension bar, and topped against the stopper member. The first compression spring is accommodated in the spring accommodation hole of the tension bar, and stopped against the stopper member opposite to the adjustment bolt. Thus, changing the position of the stopper member can adjust the downward displacement amount of the tension bar.

Preferably, the tension bar comprises a flange located at the bottom end thereof. The positioning mechanism further comprises a second compression spring sleeved onto the tension bar, and stopped between the mount and the flange of the tension bar to impart an elastic potential energy that keeps the gripping device in horizontal.

Other advantages and features of the present invention will be fully understood by reference to the following specification in conjunction with the accompanying drawings, in which like reference signs denote like components of structure.

DETAILED DESCRIPTION OF THE INVENTION

Figure 1:
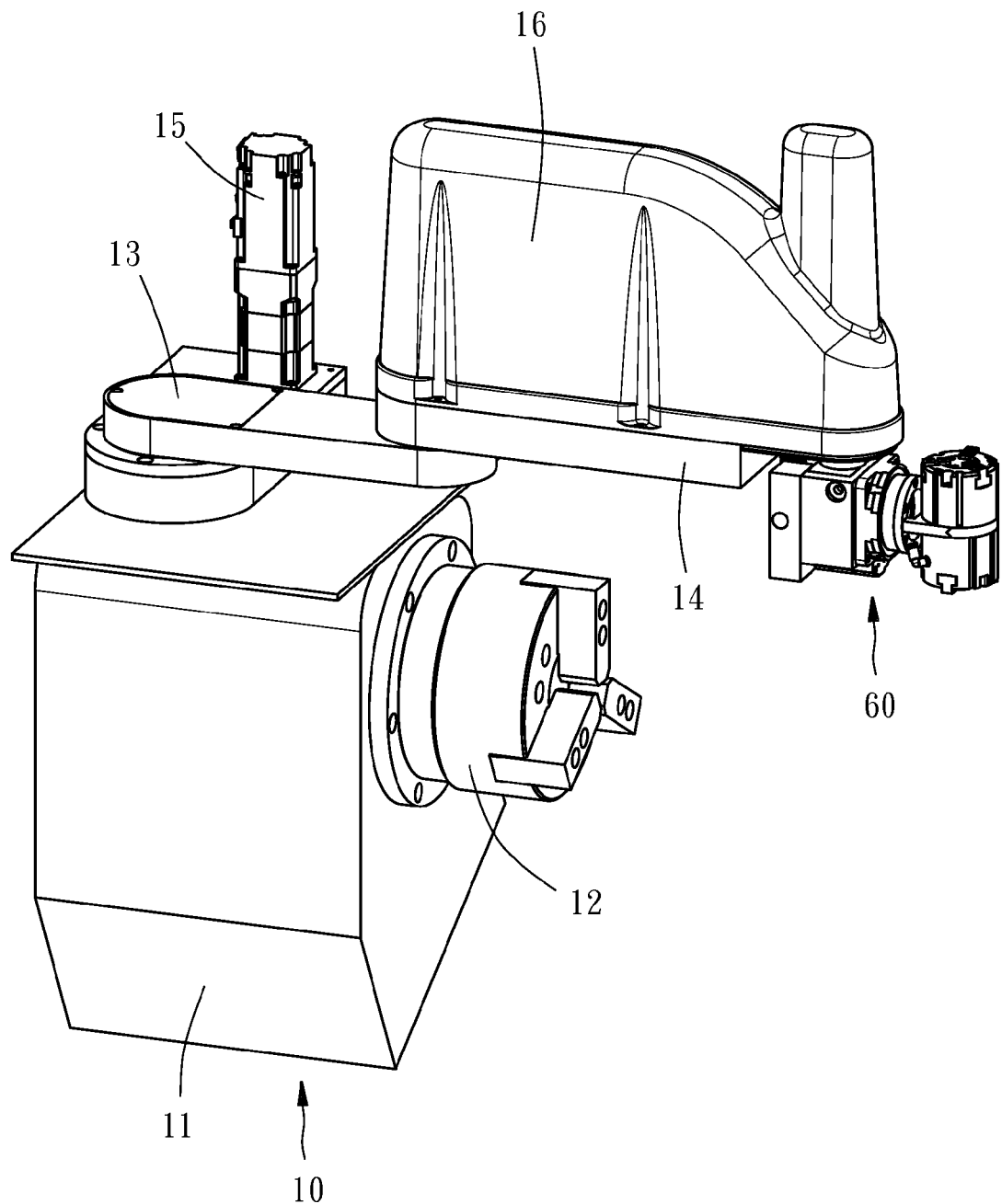
FIG. 1 is an oblique top elevational view of a processing machine with a robotic arm in accordance with the present invention.
Figure 2:
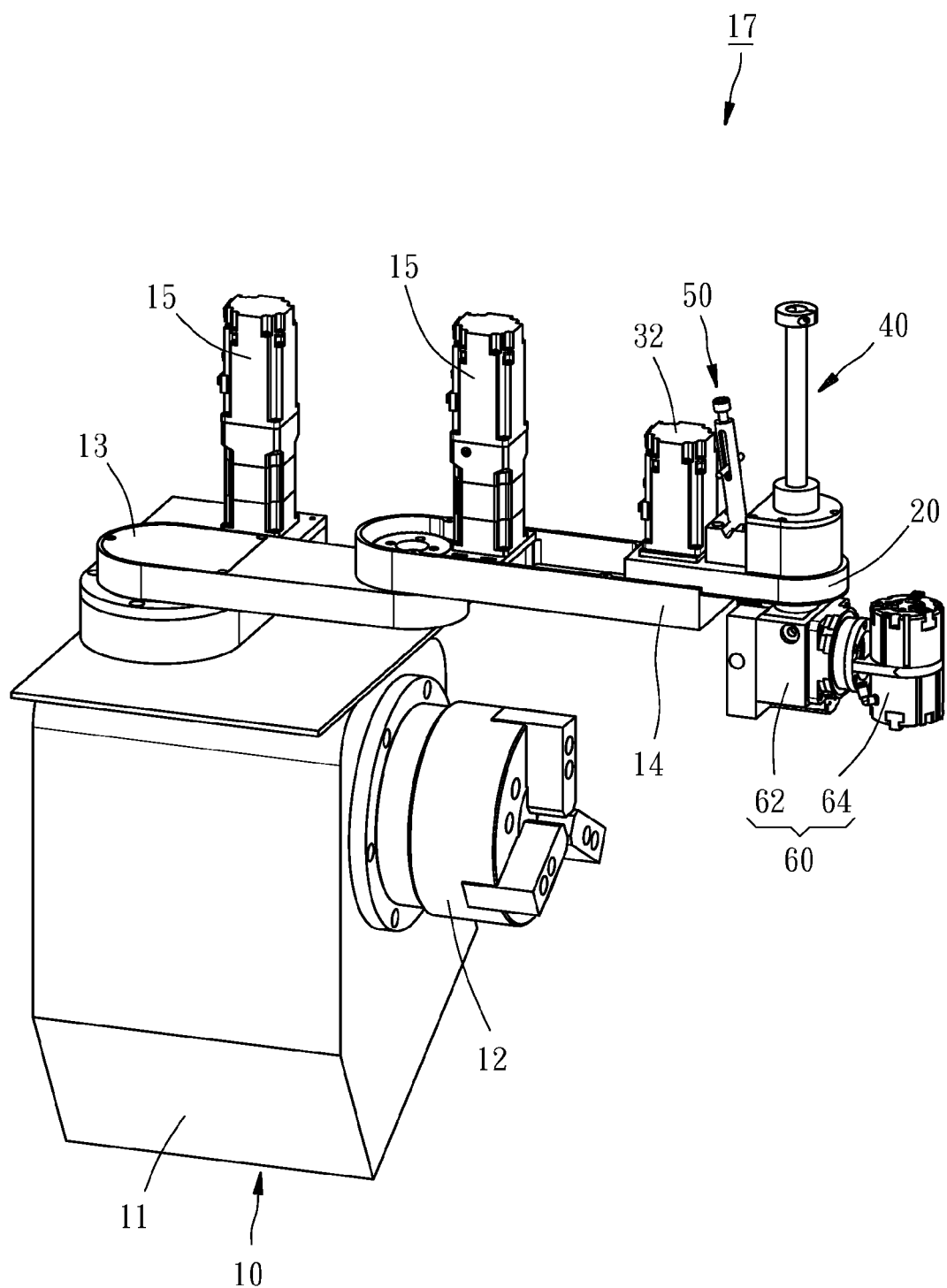
FIG. 2 is an elevational view of the robotic arm in accordance with the present invention.
Figure 3:
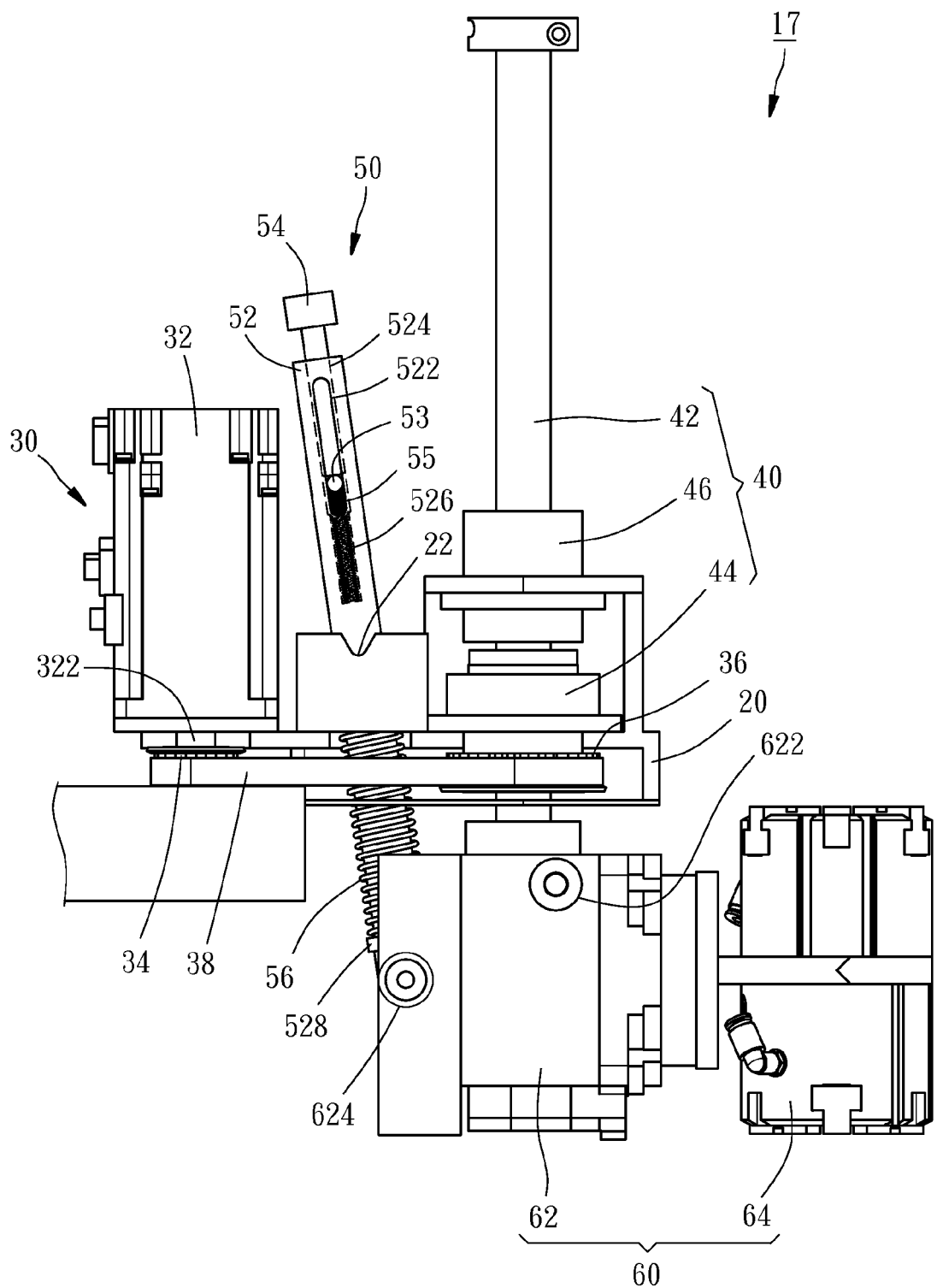
FIG. 3 is a side view of the robotic arm in accordance with the present invention.

Referring to FIGS. 1 and 2, a robotic arm 17 in accordance with the present invention is shown used in a processing machine 10. The processing machine 10 comprises a machine base 11, a chuck 12 mounted at one lateral side of the machine base 11, a first movable arm 13 and a second movable arm 14 pivotally coupled together at a top side of the machine base 11, and two servomotors 15 respectively mounted at the first movable arm 13 and the second movable arm 14 at a top side for use as power source means. Referring to FIG. 3 and FIG. 2 again, the robotic arm 17 comprises a mount 20, a driving mechanism 30, a linear transmission mechanism 40, a positioning mechanism 50, and a gripping device 60.

Referring to FIGS. 2 and 3 again, the mount 20 in this embodiment is fixedly mounted at one end of the second movable arm 14 of the processing machine 10. However, this mounting arrangement is not a limitation.

Referring to FIG. 3 again, the driving mechanism 30 comprises a motor 32, a first belt pulley 34, a second belt pulley 36, and a transmission belt 38. The motor 32 is fixedly mounted at a top side of the mount 20 with a drive shaft 322 thereof inserted into the mount 20. The first belt pulley 34 is rotatably mounted in the mount 20 and connected to the drive shaft 322 of the motor 32. The second belt pulley 36 is rotatably mounted in the mount 20 and kept apart from the first belt pulley 34 at a distance. The transmission belt 38 connects the first belt pulley 34 and the second belt pulley 34.

The linear transmission mechanism 40 comprises a ball screw spline shaft 42, a ball nut 44, and a spline socket 46. The ball screw spline shaft 42 is inserted through the second belt pulley 36 in the mount 20 in a parallel manner relative to the drive shaft 322 of the motor 32, and extended out of the bottom side of the mount 20. The hall nut 44. is rotatably mounted in the mount 20 and connected to the second belt pulley 36 of the driving mechanism 30, and also attached to the ball screw spline shaft 42. The spline socket 46 is affixed to the mount 20 and attached to the ball screw spline shaft 42 above the ball nut 44.

The positioning mechanism 50 comprises a tension bar 52, a stopper member 53, an adjustment bolt 54, and a first compression spring 55. The tension bar 52 is axially movably inserted through the mount 20, comprising an axial slot 522. The stopper member 53 is radially inserted through the axial slot 522 into the inside of the tension bar 52. During a downward displacement of the tension bar 52, the stopper member 53 will be forced into a retaining groove 22 in the mount 20 to limit the down stroke of the tension bar 52. The tension bar 52 further comprises a screw hole 524 disposed in communication with the axial slot 522, and a spring accommodation hole 526 disposed in communication with the axial slot 522. The adjustment bolt 54 is threaded into the screw hole 524 and stopped against a top end of the stopper member 53. The first compression spring 55 is accommodated in the spring accommodation hole 526 and stopped against an opposing bottom end of the stopper member 53. Thus, forwardly rotating the adjustment bolt 54 causes the stopper member 53 to be moved downwardly along the axial slot 522 by the adjustment bolt 54. On the contrary, backwardly rotating the adjustment bolt 54 causes the stopper member 53 to be pushed upwardly along the axial slot 522 by the first compression spring 55. In other words, rotating the adjustment bolt 54 can change the position of the stopper member 53 to adjust the downward displacement amount of the tension bar 52.

The gripping device 60 comprises a movable seat 62 and a grip 64. The movable seat 62 comprises a first pivot joint part 622 and a second pivot joint part 624. The first pivot joint part 622 is pivotally connected to a bottom end of the ball screw spline shaft 42 of the linear transmission mechanism 40. The second pivot joint part 624 is pivotally connected to a bottom end of the tension bar 52 of the positioning mechanism 50. The grip 64 is connected to one side of the movable seat 62 opposite to chuck 12 of the processing machine 10.

Figure 4:
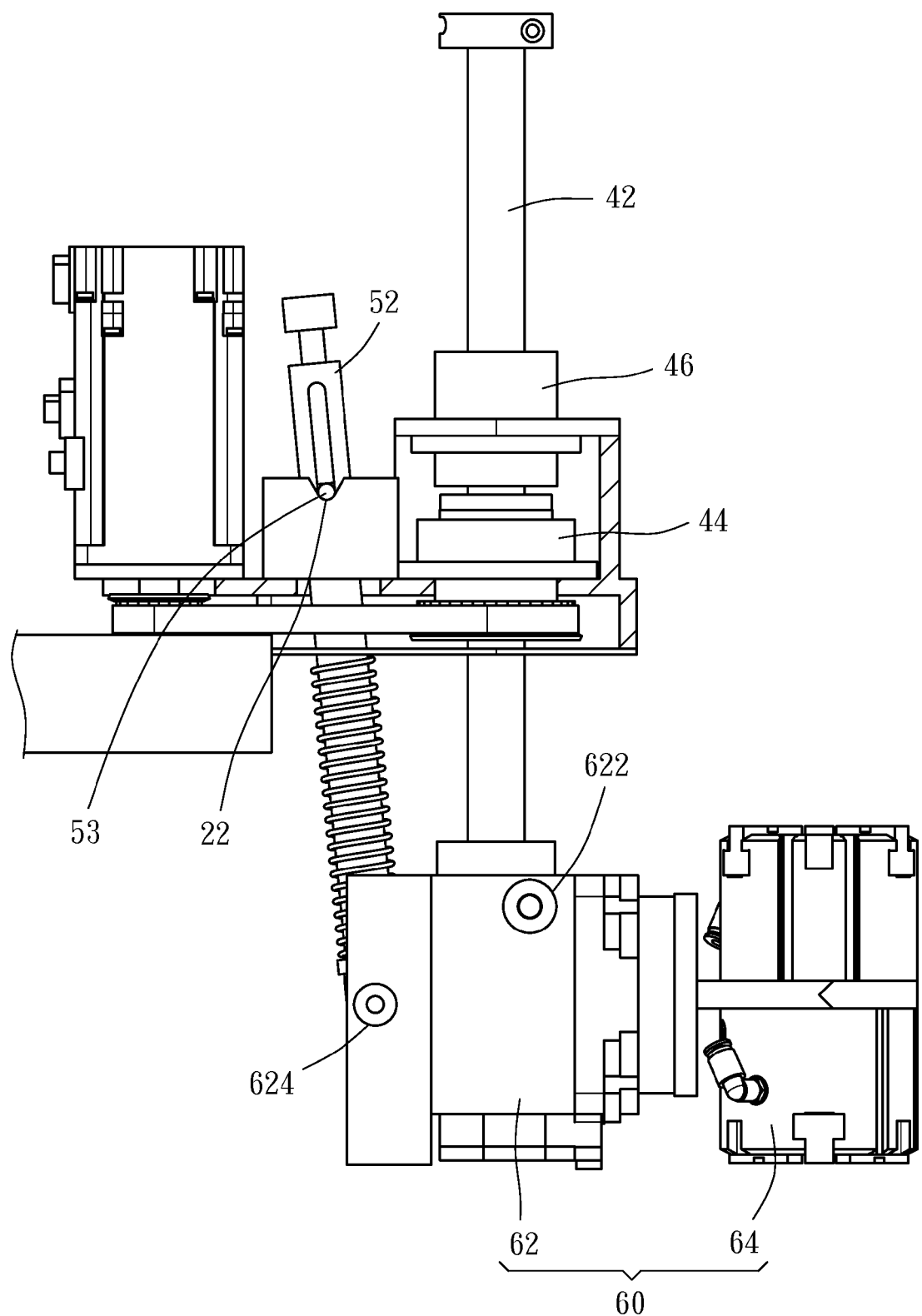
FIG. 4 is similar to FIG. 3, illustrating the ball screw spline shaft moved down.
Figure 5:
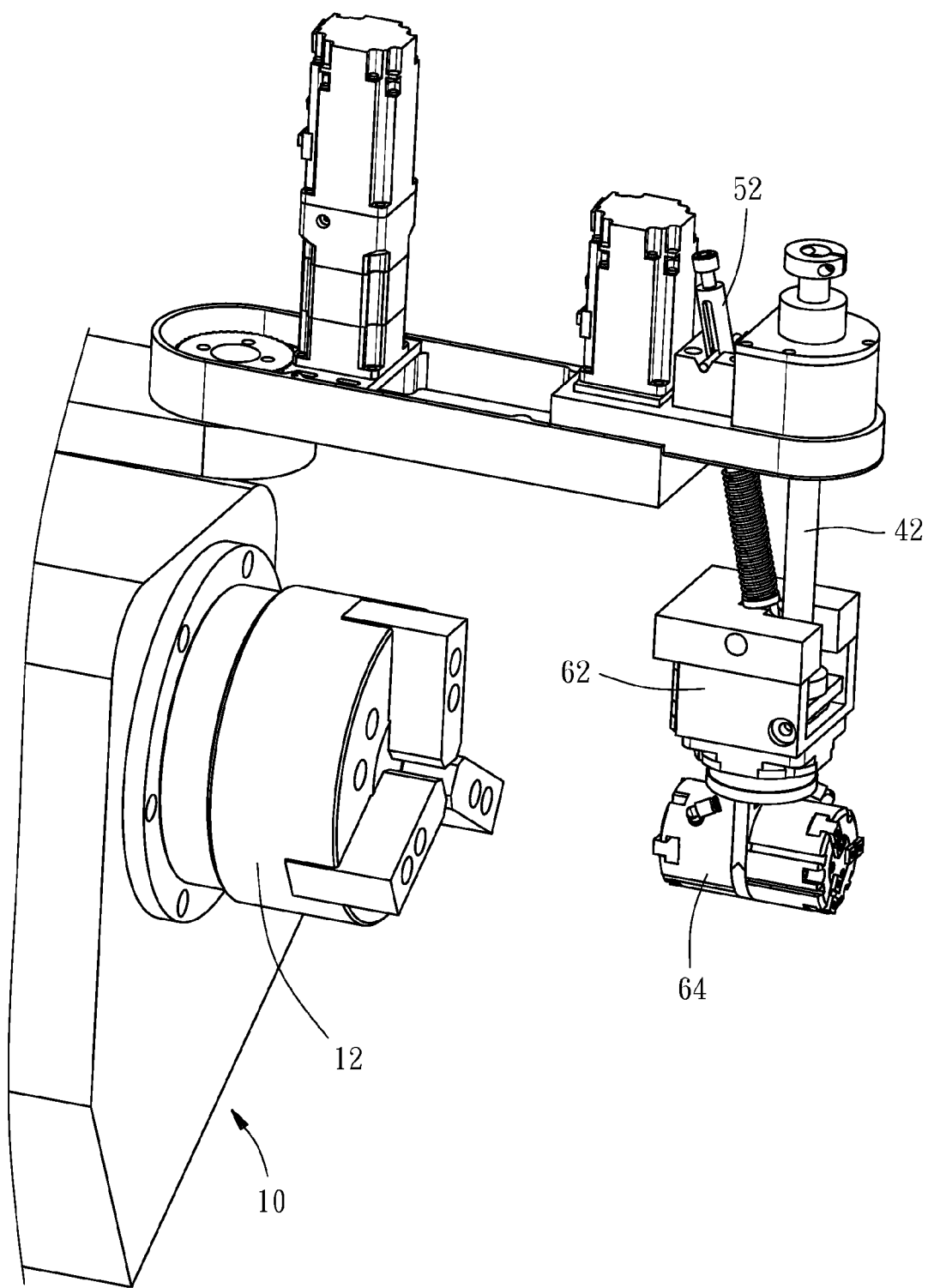
FIG. 5 is similar to FIG. 1, illustrating the grip biased.

Referring to FIG. 4 and FIG. 3 again, when the motor 32 is started to rotate the drive shaft 322, the first belt pulley 34 is moved with the drive shaft 322 to synchronously rotate the second belt pulley 36 through the transmission belt 38, causing synchronous rotation of the ball nut 44 with the second belt pulley 36. Under the circumstances, the ball screw spline shaft 42 is driven by the ball nut 44 on one hand and constrained by the spline socket 46 on the other hand, and thus, the ball screw spline shaft 42 can simply be moved axially but prohibited from making a rotary motion. During a downward movement of the ball screw spline shaft 42, the gripping device 60 is synchronously moved to carry the tension bar 52 downward till that the stopper member 53 is engaged into the retaining groove 22 of the mount 20. After the stopper member 53 is engaged into the retaining groove 22 of the mount 20, as shown in FIG. 4, the ball screw spline shaft 42 is continuously moved downward. At this time, the movable seat 62 is stopped by the stopper member 53 from moving downward with the ball screw spline shaft 42. Because the first pivot joint part 622 and second pivot joint part 624 of the movable seat 62 are spaced from each other at a certain distance, the movable seat 62 carries the grip 64 to bias toward the chuck 12 of the processing machine 10 during continuous downward movement of the ball screw spline shaft 42, as shown in FIG. 5, enabling the grip 64 to pick up the workpiece (not shown) from the chuck 12. After the grip 64 picked up the workpiece, the motor 32 is reversed, causing the ball screw spline shaft 42 to be moved upward and the grip 64 to be biased in direction away from the chuck 12, and thus the tension bar 52 is forced to carry the gripping device 60 upward to the initial position, as shown in FIG. 3. Thereafter, the servomotor 15 of the processing machine 10 is controlled to drive the first movable arm 13 and the second movable arm 14, transferring the workpiece to the to the proper placement position.

It is worth mentioning that the positioning mechanism 50 further provides a second compression spring 56 for keeping the gripping device 60 in the horizontal position when the gripping device 60 does no work. The second compression spring 56 is sleeved onto the tension bar 52 and stopped between the mount 20 and a flange 528 of the tension bar 52 to impart a proper thrust force to the movable seat 62, effectively keeping the gripping device 60 in balance. Further, the second movable arm 14 of the processing machine 10 and the mount 20 of the robotic arm 17 are protected by a common protective cover 16, enabling the driving mechanism 30, the linear transmission mechanism 40 and the positioning mechanism 50 to be kept inside the protective cover 16 and well protected against external dust, foreign objects or other debris.

In conclusion, the relative arrangement of the driving mechanism 30, linear transmission mechanism 40 and positioning mechanism 50 of the robotic arm 17 of the present invention enables the gripping device 60 to be easily moved up and down and rotated. When compared with the prior art designs, the robotic arm 17 can indeed solve the problems of high manufacturing cost and low operational efficiency and effectively achieve the objects of the present invention.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A robotic arm for processing machine, comprising:
   a mount;
   a driving mechanism comprising a motor, a first belt pulley, a second belt pulley and a transmission belt, said motor being mounted at said mount and comprising a drive shaft, said first belt pulley being rotatably mounted in said mount and connected to said drive shaft of said motor, said second belt pulley being rotatably mounted in said mount, said transmission belt being adapted to link said first belt pulley and said second belt pulley;
   a linear transmission mechanism comprising a ball screw spline shaft, a ball nut and a spline socket, said ball screw spline shaft being rotatably inserted through said mount, said ball nut being connected to said second belt pulley of said driving mechanism and attached to said ball screw spline shaft, said spline socket being affixed to said mount and attached to said ball screw spline shaft;
   a positioning mechanism comprising a tension bar and a stopper member, said tension bar being axially movably inserted through said mount, said stopper member being radially inserted through said tension bar and detachably stopped against said mount; and a gripping device comprising a movable seat and a grip connected to said movable seat, said movable seat comprising a first pivot joint part and a second pivot joint part, said first pivot joint part being pivotally connected to a bottom end of said ball screw spline shaft of said linear transmission mechanism, said second pivot joint part being pivotally connected to a bottom end of said tension bar of said positioning mechanism.

2. The robotic arm for processing machine as claimed in claim 1, wherein said mount comprises a retaining groove located on a top wall thereof for receiving said stopper member.

3. The robotic arm for processing machine as claimed in claim 1, wherein said tension bar comprises an axial slot, a screw hole disposed in communication with said axial slot and a spring accommodation hole disposed in communication with said axial slot; said stopper member is inserted through said axial slot of said tension bar; said positioning mechanism further comprises an adjustment bolt and a first compression spring, said adjustment bolt being threaded into said screw hole of said tension bar and topped against said stopper member, said first compression spring being accommodated in said spring accommodation hole of said tension bar and stopped against said stopper member opposite to said adjustment bolt.

4. The robotic arm for processing machine as claimed in claim 1, wherein said tension bar comprises a flange located at the bottom end thereof; said positioning mechanism further comprises a second compression spring sleeved onto said tension bar and stopped between said mount and said flange of said tension bar.

* * * * *